("12") United States Patent  
Partusch et al.

(10) Patent No.: US 12,552,111 B2
(45) Date of Patent: Feb. 17, 2026

(54) METHOD FOR PRODUCING POLYURETHANE SANDWICH MOLDED PARTS

(71) Applicant: BASF SE, Ludwigshafen am Rhein (DE)

(72) Inventors: Georg Partusch, Lemfoerde (DE); Juergen Schneider, Lemfoerde (DE); Gerd Westermann, Lemfoerde (DE); Klaus Schmutzer, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 794 days.

(21) Appl. No.: 16/955,462

(22) PCT Filed: Dec. 11, 2018

(86) PCT No.: PCT/EP2018/084328
§ 371 (c)(1),
(2) Date: Jun. 18, 2020

(87) PCT Pub. No.: WO2019/121156
PCT Pub. Date: Jun. 27, 2019

(65) Prior Publication Data
US 2020/0368978 A1 Nov. 26, 2020

(30) Foreign Application Priority Data
Dec. 21, 2017 (EP) .................... 17209234

(51) Int. Cl.
B29C 70/34 (2006.01)
B29C 70/08 (2006.01)
B32B 3/12 (2006.01)
B32B 5/02 (2006.01)
B32B 7/12 (2006.01)
B32B 15/14 (2006.01)
B32B 27/12 (2006.01)
B32B 29/02 (2006.01)
B32B 37/12 (2006.01)
B32B 37/14 (2006.01)
C08G 18/10 (2006.01)
C08G 18/48 (2006.01)
(Continued)

(52) U.S. Cl.
CPC ............ *B29C 70/34* (2013.01); *B29C 70/086* (2013.01); *B32B 3/12* (2013.01); *B32B 5/02* (2013.01); *B32B 7/12* (2013.01); *B32B 15/14* (2013.01); *B32B 27/12* (2013.01); *B32B 29/02* (2013.01); *B32B 37/12* (2013.01); *B32B 37/146* (2013.01); *C08G 18/10* (2013.01); *C08G 18/4841* (2013.01); *C08G 18/7671* (2013.01); *B29K 2075/00* (2013.01); *B29K 2105/0872* (2013.01); *B29K 2105/20* (2013.01); *B29K 2307/04* (2013.01); *B29K 2309/08* (2013.01); *B29K 2715/003* (2013.01); *B29L 2031/30* (2013.01); *B32B 2037/1261* (2013.01); *B32B 2250/40* (2013.01); *B32B 2255/26* (2013.01); *B32B 2260/021* (2013.01); *B32B 2262/101* (2013.01); *B32B 2262/106* (2013.01); *B32B 2305/024* (2013.01); *B32B 2307/738* (2013.01); *B32B 2313/04* (2013.01); *B32B 2315/085* (2013.01); *B32B 2605/00* (2013.01)

(58) Field of Classification Search
CPC ..... B29C 70/34; B29C 70/086; B29C 65/526; B29C 70/345; B32B 37/146; B32B 5/18; B32B 5/02; B32B 27/42
See application file for complete search history.

(56) References Cited

U.S. PATENT DOCUMENTS 6,465,104 B1 * 10/2002 Krebs .................... C08G 18/12
525/131
8,465,840 B2 * 6/2013 Fader ...................... B29C 70/30
428/423.1
(Continued)

FOREIGN PATENT DOCUMENTS

EP 0251267 A1 * 1/1987
EP 2257580 A2 12/2010
(Continued)

OTHER PUBLICATIONS

English Translation of Partusch (EP2438102) (Year: 2010).*
(Continued)

*Primary Examiner* — Michael A Tolin
*Assistant Examiner* — Hana C Page
(74) *Attorney, Agent, or Firm* — Armstrong Teasdale LLP

(57) ABSTRACT

Described herein is a process for producing polyurethane sandwich moldings including at least one core layer and at least one reinforcing fiber layer, where (i) at least one reinforcing fiber layer is applied onto a core layer and a moisture-curing polyurethane adhesive is applied to a reinforcing fiber layer, (ii) the part from (i) is placed into a mold and pressed in the mold and the moisture-curing polyurethane adhesive is cured, and (iii) the molding from (ii) is removed from the mold and optionally subjected to further operations, where the moisture-curing polyurethane adhesive is applied before or after application of the reinforcing fiber layer onto the at least one core layer and for the curing the moisture-curing polyurethane adhesive is brought into contact with water or with a solution comprising water. Also described herein are a polyurethane sandwich molding obtainable by such a process and a method of using a polyurethane sandwich molding in vehicles.

17 Claims, No Drawings

(51) Int. Cl.
*C08G 18/76* (2006.01)
*B29K 75/00* (2006.01)
*B29K 105/08* (2006.01)
*B29K 105/20* (2006.01)
*B29K 307/04* (2006.01)
*B29K 309/08* (2006.01)
*B29L 31/30* (2006.01)

(56) References Cited

U.S. PATENT DOCUMENTS

| | | | | |
|---|---|---|---|---|
| 10,487,237 | B2 * | 11/2019 | Burckhardt | C09D 175/08 |
| 2008/0280145 | A1 * | 11/2008 | Paschkowski | B29C 65/4815 |
| | | | | 428/424.7 |
| 2011/0014480 | A1 * | 1/2011 | Fader | B29C 70/086 |
| | | | | 428/423.1 |
| 2015/0064441 | A1 * | 3/2015 | Monolo | C09J 11/06 |
| | | | | 156/305 |

FOREIGN PATENT DOCUMENTS

| | | | |
|---|---|---|---|
| EP | 2438102 A1 * | 4/2012 | B32B 5/022 |
| EP | 2597107 A1 | 5/2013 | |
| WO | 2008113751 A1 | 9/2008 | |

OTHER PUBLICATIONS

English Translation of Fukuchi (JP2017165813A) (Year: 2017).*
International Search Report for corresponding PCT/EP2018/084328 mailed Feb. 11, 2019, 3 pages.
European Search Report for related EP Patent Application No. 17209234.8, Issued on Mar. 14, 2018, 4 pages. No English Translation available.

* cited by examiner

METHOD FOR PRODUCING POLYURETHANE SANDWICH MOLDED PARTS

CROSS-REFERENCE TO RELATED APPLICATIONS

This application is a U.S. National Phase Application of PCT/EP2018/084328, filed Dec. 11, 2018, which claims the benefit of priority to European Patent Application 17209234.8, filed Dec. 21, 2017, the entire contents of which are hereby incorporated by reference herein.

The present invention relates to a process for producing polyurethane sandwich moldings comprising at least one core layer and at least one reinforcing fiber layer, wherein (i) at least one reinforcing fiber layer is applied onto a core layer and a moisture-curing polyurethane adhesive is applied to a reinforcing fiber layer, (ii) the part from (i) is placed into a mold and pressed in the mold and the moisture-curing polyurethane adhesive is cured, and (iii) the molding from (ii) is removed from the mold and optionally subjected to further operations, wherein the moisture-curing polyurethane adhesive is applied before or after application of the reinforcing fiber layer onto the at least one core layer and for the curing the moisture-curing polyurethane adhesive is brought into contact with water or with a solution comprising water. The present invention further relates to a polyurethane sandwich molding obtainable by such a process and to the use of a polyurethane sandwich molding in vehicles.

Polyurethane sandwich components have long been known. These are produced by covering a core layer with a reinforcing layer. A polyurethane reaction mixture is sprayed onto this "semifinished sandwich product" on one side, in many cases also on two sides. The part covered with the polyurethane reaction mixture, the unfinished sandwich part, is subsequently placed into a mold in which the semifinished sandwich product is given a specific shape by pressing in a thermal pressing process and the polyurethane reaction mixture is cured to give the polyurethane. The reinforcing layer is compressed during the pressing. The compression can be varied over a broad range here and can range from a few tens of millimeters to a compression of a few percent of the starting thickness. The polyurethane sandwich component thus obtained is then demolded. The external profile is then shaped by squeezing the sandwich package in a shaping mold.

In particular in the region of the edges of such compressed regions and also at the transitions to less-compressed regions, the core layer can only be sealed by polyurethane if, after the compression, there is still sufficient free-flowing polyurethane reaction mixture present to cover these regions. Such processes are disclosed for example in the brochure "PUR—Faserverbundwerkstoffe für den Leichtbau im Fahrzeuginnenraum" [PUR—fiber composite materials for lightweight construction in vehicle interiors] from Bayer AG Leverkusen (order number: PU 52248) or "Baypreg F—PUR plus Natur im Automobil, Verbundwerkstoffe aus Polyurethan" [Baypreg F—PUR plus natural materials in automobiles; composite materials made from polyurethane] from Bayer AG Leverkusen.

A disadvantage of this process is that high investment in equipment is required, since the spray application of a polyurethane reaction mixture for safety reasons necessitates the installation of an effective extraction device for extracting aerosols. The application of liquid reaction mixtures to a reinforcing element also often leads to problems with running and dripping of polyurethane material before placing the unfinished sandwich element into a mold. Attempts at a solution have been described for example in WO 2008/113751 and EP 2257580, yet running cannot be completely prevented.

It was therefore an object of the present invention to provide an alternative process for producing polyurethane sandwich moldings that is simple to carry out and does not require any expensive investments in equipment. It was also an object of the present invention to prevent running of the applied polyurethane material and yet still ensure sufficient flowability in the mold, so that clean edge formation is possible.

The object of the invention is achieved by a process for producing polyurethane sandwich moldings comprising at least one core layer and at least one reinforcing fiber layer, wherein (i) at least one reinforcing fiber layer is applied onto a core layer and a moisture-curing polyurethane adhesive is applied to a reinforcing fiber layer, (ii) the part from (i) is placed into a mold and pressed in the mold and the moisture-curing polyurethane adhesive is cured, and (iii) the molding from (ii) is removed from the mold and optionally subjected to further operations, wherein the moisture-curing polyurethane adhesive is applied before or after application of the reinforcing fiber layer onto the at least one core layer and for the curing the moisture-curing polyurethane adhesive is brought into contact with water or with a solution comprising water.

In the context of the invention, a moisture-curing polyurethane adhesive is understood as meaning a mixture comprising an isocyanate group-comprising prepolymer, or the isocyanate group-comprising prepolymer itself, wherein the mixture includes at least 50% by weight, preferably at least 80% by weight and in particular at least 95% by weight of an isocyanate group-comprising prepolymer. A moisture-curing polyurethane adhesive according to the invention can also comprise further additives such as surface-active substances, such as mold release agents and/or defoamers, inhibitors, such as diglycol bis(chloroformate) or orthophosphoric acid, plasticizers, inorganic fillers, such as sand, kaolin, chalk, barium sulfate, silicon dioxide, oxidation stabilizers, dyes and pigments, stabilizers, e.g. against hydrolysis, light, heat or discoloration, inorganic and/or organic fillers, emulsifiers, flame retardants, ageing stabilizers and adhesion promoters, and also catalysts commonly used in polyurethane chemistry. The viscosity of the moisture-curing polyurethane adhesive according to the invention here is preferably in a range from 5000 to 50 000 mPas, particularly preferably from 5000 to 30 000, more preferably 6000 to 20 000 and especially 7000 to 15 000 mPas, measured at 25° C. according to DIN 53 018.

An isocyanate group-containing prepolymer is understood within the context of the invention to mean the reaction product of polyisocyanates with polymeric compounds having at least two isocyanate-reactive groups, optionally compounds having one isocyanate-reactive group, and optionally chain extenders and/or crosslinking agents, where the polyisocyanate is used in excess.

The polyisocyanates used for preparing the isocyanate group-containing prepolymer can be any aliphatic, cycloaliphatic and aromatic difunctional or polyfunctional isocyanates known from the prior art and any desired mixtures thereof. Aromatic di- or polyfunctional isocyanates are preferably used. Examples are diphenylmethane 4,4'-, 2,4'-, and 2,2'-diisocyanate (MDI), mixtures of monomeric diphenylmethane diisocyanates and higher polycyclic homologs of diphenylmethane diisocyanate (polymer MDI), tetramethylene diisocyanate, hexamethylene diisocyanate (HDI), isophorone diisocyanate (IPDI), naphthalene 1,5-diisocyanate (NDI), toluene 2,4,6-triisocyanate and toluene 2,4- and 2,6-diisocyanate (TDI), or mixtures thereof.

Particular preference is given to using aromatic isocyanates preferably selected from the group consisting of toluene 2,4-diisocyanate, toluene 2,6-diisocyanate, diphenylmethane 2,4'-diisocyanate and diphenylmethane 4,4'-diisocyanate and higher polycyclic homologs of diphenylmethane diisocyanate (polymer MDI), and mixtures of these. The isocyanate used is in particular an aromatic isocyanate selected from the group consisting of diphenylmethane 2,4'-diisocyanate, diphenylmethane 4,4'-diisocyanate, higher polycyclic homologs of diphenylmethane diisocyanate or mixtures of two or more of these compounds.

Polymeric isocyanate-reactive compounds having at least two isocyanate-reactive groups used for the preparation of the isocyanate group-containing prepolymer may be any compounds having at least two isocyanate-reactive groups. These have a molecular weight of at least 400 g/mol. Preference is given to using polyesterols, polyetherols or polyether-polyesterols that may be obtained, for example, by alkoxylation of polyesters.

Polyetherols are prepared from one or more alkylene oxides having 2 to 4 carbon atoms in the alkylene radical by known processes, for example by anionic polymerization with alkali metal hydroxides or alkali metal alkoxides as catalysts and with addition of at least one starter molecule comprising 2 to 5, preferably 2 to 4 and particularly preferably 2 to 3, especially 2, reactive hydrogen atoms in bonded form or by cationic polymerization with Lewis acids such as antimony pentachloride or boron trifluoride etherate. Moreover, catalysts used may also be multimetal cyanide compounds, so-called DMC catalysts. Examples of suitable alkylene oxides are tetrahydrofuran, 1,3-propylene oxide, 1,2- and 2,3-butylene oxide and preferably ethylene oxide and 1,2-propylene oxide. The alkylene oxides may be used individually, alternately in succession or as mixtures. Preference is given to using 1,2-propylene oxide, ethylene oxide or mixtures of 1,2-propylene oxide and ethylene oxide.

Suitable starter molecules preferably include water or di- and trihydric alcohols such as ethylene glycol, propane-1,2- or -1,3-diol, diethylene glycol, dipropylene glycol, butane-1,4-diol, glycerol, and trimethylolpropane.

The preferred polyether polyols, particularly preferably polyoxypropylene polyols or polyoxypropylene-polyoxyethylene polyols, are obtainable by alkoxylation of a starter molecule having a functionality of 2 to 4, particularly preferably 2 and 3 show an average content of ethylene oxide, based on the total weight of alkylene oxide, of 20% to 70% by weight, preferably 25% to 60% by weight and especially 30% to 50% by weight. The preferred polyetherols have a number-average molecular weight of 400 to 9000 g/mol, preferably 1000 to 6000, particularly preferably 1500 to 5000 and especially from 2000 to 4000 g/mol. Increasing the content of ethylene oxide and reducing the functionality while leaving the molecular weight unchanged typically results in a reduction in the viscosity of the polyetherols.

The polymeric, isocyanate-reactive compounds used may also be hydrophobic polyols. The hydrophobic polyol used in this case is preferably a hydroxyl-functionalized oleochemical compound, an oleochemical polyol. A number of hydroxyl-functional oleochemical compounds that may be used are known. Examples are castor oil, oils such as grapeseed oil, black cumin oil, pumpkin seed oil, borage seed oil, soybean oil, wheatgerm oil, rapeseed oil, sunflower oil, peanut oil, apricot kernel oil, pistachio kernel oil, almond oil, olive oil, macadamia nut oil, avocado oil, sea buckthorn oil, sesame oil, hazelnut oil, evening primrose oil, wild rose oil, hemp oil, safflower oil, walnut oil that have been modified with hydroxyl groups, and fatty acid esters modified with hydroxyl groups and based on myristoleic acid, palmitoleic acid, oleic acid, vaccenic acid, petroselinic acid, gadoleic acid, erucic acid, nervonic acid, linoleic acid, linolenic acid, stearidonic acid, arachidonic acid, timnodonic acid, clupanodonic acid, and cervonic acid. Preference here is given to using castor oil and the reaction products thereof with alkylene oxides or ketone-formaldehyde resins. The latter compounds are marketed by, for example, Bayer AG under the name Desmophen® 1150. In a particularly preferred embodiment, the polymeric isocyanate-reactive compounds having at least two isocyanate-reactive groups comprise hydrophobic polyetherols or polyesterols.

In addition to the polymeric compounds having at least two isocyanate-reactive groups, compounds having only one isocyanate-reactive group can also be used. These are preferably polyether monools that are obtained starting from monofunctional starter molecules, for example ethylene glycol monomethyl ether, in analogous manner to the polyetherols described above. The molecular weight of the polyether monools used here is preferably 100 to 1000 g/mol. If polyether monools are used, the weight ratio of polyether monool to polyether polyol is preferably 1:30 to 4:1; preferably no compounds having only one isocyanate-reactive group are used.

Chain extenders and/or crosslinking agents can optionally also be used for the preparation of the isocyanate group-containing prepolymer. The addition of the chain extenders and/or crosslinking agents may take place before, together with, or after the addition of the polyols. The chain extenders and/or crosslinking agents used are substances having a molecular weight of preferably less than 400 g/mol, particularly preferably of 60 to 350 g/mol, where chain extenders have 2 isocyanate-reactive hydrogen atoms and crosslinking agents have 3 isocyanate-reactive hydrogen atoms. These may be used individually or in the form of mixtures. Where chain extenders are used, propane-1,3- and -1,2-diol, dipropylene glycol, tripropylene glycol, and butane-1,3-diol are particularly preferred.

If chain extenders, crosslinking agents or mixtures thereof are used, these are expediently used in amounts of 1% to 30% by weight, preferably 1.5% to 20% by weight, and especially 2% to 10% by weight, based on the weight of polyisocyanates, relative to polymeric isocyanate-reactive compounds and chain extenders and/or crosslinking agents; preferably no chain extenders and/or crosslinking agents are used.

Customary polyurethane catalysts, preferably amine-containing polyurethane catalysts, may optionally also be used in the preparation of the isocyanate group-containing prepolymer. Such catalysts are described, for example, in "Kunststoffhandbuch [Plastics Handbook], volume 7, Polyurethane [Polyurethanes]", Carl Hanser Verlag, 3rd edition 1993, chapter 3.4.1. The catalysts preferably comprise strongly basic amine catalysts. Examples of these include amidines such as 2,3-dimethyl-3,4,5,6-tetrahydropyrimidine, tertiary amines such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds such as triethanolamine, triisopropanolamine, N-methyl- and N-ethyldiethanolamine, and dimethylethanolamine. The catalysts may be used individually or as mixtures. Preferably, no catalysts are used in the preparation of the isocyanate-containing prepolymer.

For the preparation of the isocyanate group-containing prepolymer, the polyisocyanates described are reacted in excess, for example at temperatures of 30 to 100° C., preferably at about 80° C., with the polymeric compounds having at least two isocyanate-reactive groups, optionally compounds having only one isocyanate-reactive group, and optionally chain extenders and/or crosslinking agents, to give the prepolymer. In this process, polyisocyanate, polymeric compounds having at least two isocyanate-reactive groups, optionally compounds having one isocyanate-reactive group and optionally chain extenders and/or crosslinking agents are mixed with each other preferably in a ratio of isocyanate groups to isocyanate-reactive groups of 1.5:1 to 15:1, preferably 1.8:1 to 8:1. For the preparation of the prepolymers, polyisocyanates, polymeric compounds having at least two isocyanate-reactive groups, optionally compounds having one isocyanate-reactive group and optionally chain extenders and/or crosslinking agents are mixed with each other in a ratio such that the NCO content of the prepolymer prepared is preferably in the range from 5 to 20, especially from 7 to 15% by weight, based on the total weight of the isocyanate prepolymer prepared. Subsequently, volatile isocyanates can preferably be removed, preferably by thin-film distillation. The viscosity of the isocyanate prepolymers according to the invention here is preferably from 5000 to 50 000 mPas, more preferably from 5000 to 30 000 mPas and especially 5000 to 15 000 mPas, in each case at 25° C. This can be adjusted, for example, through adjustment of the isocyanate index, the average functionality, and the polyols and isocyanates used. Such modifications are known to those skilled in the art. The average isocyanate functionality of the isocyanate prepolymers is preferably 2.0 to 2.9, particularly preferably 2.1 to 2.6.

The moisture-curing polyurethane adhesive can also comprise catalysts for the polyurethane reaction. Examples of these include amidines such as 2,3-dimethyl-3,4,5,6-tetrahydropyrimidine, tertiary amines such as triethylamine, tributylamine, dimethylbenzylamine, N-methyl-, N-ethyl-, and N-cyclohexylmorpholine, N,N,N',N'-tetramethylethylenediamine, N,N,N'N-tetramethylbutanediamine, N,N,N', N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds such as triethanolamine, triisopropanolamine, N-methyl- and N-ethyldiethanolamine, and dimethylethanolamine. Suitable catalysts also include organic metal compounds, preferably organic tin compounds, such as tin(II) salts of organic carboxylic acids, for example tin(II) acetate, tin(II) octoate, tin(II) ethylhexoate and tin(II) laurate, and the dialkyltin(IV) salts of organic carboxylic acids, for example dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate, or mixtures thereof. The organic metal compounds may be used alone or in combination with basic amines.

In a preferred embodiment, the moisture-curing polyurethane adhesive of the present invention comprises, as catalyst, a thermally activatable catalyst of which the activation temperature is above the temperature of the roll application of the prepolymer. Suitable catalysts are described for example in EP2257580 and include carboxylic salts of amine catalysts that are customary for the production of polyurethane. Here, the carboxylic salts of the basic amine catalysts are obtained by mixing the amine catalysts with carboxylic acids. This can be done in a separate step, optionally using a solvent, or by adding the acid and the basic amine catalyst to one of the starting substances to prepare the isocyanate group-comprising prepolymer.

The carboxylic salt of the amine catalyst is preferably obtained by mixing carboxylic acid and basic amine catalyst in a separate step, optionally with heating. Preferably, an alcohol, particularly preferably a dihydric or trihydric alcohol having a molecular weight of less than 120 g/mol, especially ethylene glycol, is used here as solvent. The carboxylic salt of an amine catalyst thus formed can then in a further step be mixed with the isocyanate group-containing prepolymer.

Basic amine catalysts are described, for example, in "Kunststoffhandbuch [Plastics Handbook], volume 7, Polyurethane [Polyurethanes]", Carl Hanser Verlag, 3rd edition 1993, chapter 3.4.1. Examples of these include amidines such as 2,3-dimethyl-3,4,5,6-tetrahydropyrimidine, tertiary amines such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, N,N-bis(3-dimethylaminopropyl)-N-isopropanolamine, dimethylpiperazine, 1,2-dimethylimidazole, 1-azabicyclo[3.3.0]octane, and preferably 1,4-diazabicyclo[2.2.2]octane, and alkanolamine compounds such as triethanolamine, triisopropanolamine, N-methyl- and N-ethyldiethanolamine, N,N-bis(3-dimethylaminopropyl)-N-isopropanolamine and dimethylethanolamine. In particular, basic amine catalysts having at least one, preferably precisely one, isocyanate-reactive group are used here, such as N,N-bis(3-dimethylaminopropyl)-N-isopropanolamine. The catalysts may be used individually or as mixtures.

Carboxylic acids used are preferably those having a molecular weight of less than 300 g/mol. Particular preference is given here to using saturated and unsaturated aliphatic monocarboxylic acids having 1 to 18 carbon atoms, such as formic acid, acetic acid, cyanoacetic acid or 2-ethylhexanoic acid, aromatic carboxylic acids, aliphatic, saturated and unsaturated dicarboxylic acids having 2 to 16 carbon atoms, or tricarboxylic acids, or mixtures of these. Derivatives of the abovementioned carboxylic acids may also be used. Carboxylic acids used are more preferably dicarboxylic acids of the general formula $HOOC-(CH_2)_n-COOH$, where n is an integer from 2 to 14. Such dicarboxylic acids are generally less corrosive. The carboxylic acid used is in particular adipic acid.

The ratio of acid and amine catalyst is selected here such that, based on one equivalent of amine of the amine catalyst, 0.5 to 1.5, preferably 0.7 to 1.3, particularly preferably 0.90 to 1.10 and especially 0.95 to 1.05 equivalents of acid groups of a carboxylic acid are present. The carboxylic salt of an amine catalyst (c) can for example be used at a concentration of 0.001% to 10% by weight, preferably 0.05% to 5% by weight and particularly preferably 0.05% to 2% by weight, based on the total weight of the isocyanate group-comprising prepolymer. Preferably, less than 2% by weight of catalyst or catalyst combination, particularly preferably less than 1% by weight and especially no catalyst or catalyst combination, based on the weight of the isocyanate group-comprising prepolymer, is added.

The moisture-curing polyurethane adhesive can also comprise customary additives such as dyes, pigments, fillers, mold release agents, defoamers or other processing aids. These additives are generally known for polyurethane adhesives. Preferably, no mold release agents are present.

According to the invention, in a first step the moisture-curing polyurethane adhesive can be applied to a reinforcing fiber layer. This application can be effected on one side or on both sides. Subsequently, the reinforcing fiber layer comprising polyurethane adhesive is applied onto the core layer. The reinforcing fiber layer thus impregnated with polyurethane adhesive can optionally be cut to size and applied directly onto the core layer. As an alternative, the impregnated reinforcing fiber layer is not applied directly onto the reinforcing fiber layer. The application of the impregnated reinforcing fiber layer onto the core layer can be done one hour to 3 months, preferably one day to 4 weeks and especially 2 days to 2 weeks after application of the polyurethane adhesive to the reinforcing fiber layer. During this time, the impregnated reinforcing fiber layer may for example be cut to size and stacked or wound in web form onto rolls, with contact between impregnated layers being avoided if necessary, for example via use of a release paper.

The impregnated reinforcing fiber layer can also be cured in a mold without use of a core layer. Optionally, one or both sides of the core layer can be coated with a thermoplastic material, for example during the molding process.

As an alternative, the reinforcing fiber layer may also first be applied onto the core layer on one side or on both sides and then the polyurethane adhesive can be applied to the side of the reinforcing fiber layer that faces away from the core layer. Preference is given to first applying the polyurethane adhesive to the reinforcing fiber layer and subsequently applying the reinforcing fiber layer comprising polyurethane adhesive onto the core layer.

As material for the core layer, preference is given here to using thermoformable polyurethane foams and paper honeycombs, metal honeycombs or plastics honeycombs. The reinforcing fiber layer used may preferably be glass fiber mats, glass fiber nonwovens, random-laid glass fibers, woven glass fiber fabrics, chopped or ground glass or mineral fibers, natural fiber mats and knits, chopped natural fibers and fiber mats, nonwovens and knits, these mats, nonwovens and knits being based on polymer fibers, on carbon fibers or on aramid fibers, and also mixtures of these; the reinforcing fiber layer used is particularly preferably glass fiber layers or carbon fiber layers. Here, the reinforcing fiber layer may be applied to one side of the core layer and preferably to both sides of the core layer.

Application of the polyurethane adhesives according to the invention to the reinforcing fiber layer can be effected by customary methods, such as spray application, knife-coating or roll application, preference being given to roll application, for example using a metering roller and an application roller. These application techniques are known to those skilled in the art and described for example in Artur Goldschmidt, Hans-Joachim Streitberger, BASF Handbook on Basics of Coating Technology, 2003. The application can be effected at customary temperatures, for example 10° to 100° C., preferably at elevated temperatures of 30° to 90° and especially 50° to 85° C. The amount applied can vary within customary ranges and is preferably in a range from 150 g/m² to 5000 g/m², particularly preferably from 200 to 2000 g/m², more preferably 400 to 1000 g/m² and especially 500 to 800 g/m². If the polyurethane adhesive is applied to the reinforcing fiber layer before this is applied onto the core layer, the polyurethane adhesive is preferably applied to the reinforcing fiber layer on both sides of the reinforcing fiber layer, the amounts mentioned being distributed between the two sides of the reinforcing fiber layer in equal or dissimilar portions. One embodiment of the roll application is shown in FIG. 1.

This affords an unfinished sandwich element which has at least one core layer and at least one reinforcing fiber ply comprising the moisture-curing polyurethane adhesive.

In order for the moisture-curing polyurethane adhesive to cure, it has to be brought into contact with water or with a solution comprising water. This can be effected, for example, by means of steam treatment during the molding process or by application of water or of an aqueous solution, for example by spray application, prior to the molding process. The unfinished sandwich element is preferably sprayed with water or an aqueous solution before the molding process (ii). Alternatively, in a less preferred embodiment, the reinforcing fiber layer comprising polyurethane adhesive can also be sprayed with water or the aqueous solution before application onto the core layer, for example immediately before application onto the core layer. In a further alternative, water may already be present in the core layer or in the reinforcing fiber layer. This can evaporate for example due to the supply of heat during the molding process and in this way be made accessible to the moisture-curing polyurethane adhesive for the curing.

In a particularly preferred embodiment, an aqueous, alkaline solution is used to this end. This preferably has a pH of at least 10, by preference of at least 11, particularly preferably of at least 12, more preferably at least 13 and especially at least 13.5. The maximum pH is in this case not limited. However, for process engineering reasons, the OH⁻ concentration is preferably not more than 10 mol/l, particularly preferably not more than 5 mol/l, more preferably not more than 3 mol/l and especially not more than 2 mol/l. The aqueous, alkaline solution particularly preferably comprises an alkali metal solution, such as an alkali metal silicate solution, an alkali metal carbonate solution or an alkali metal hydroxide solution.

The alkaline, aqueous alkali metal solution preferably has an alkali metal concentration of 0.1 to 10 mol. In particular, in the solution preference is given to the alkali metal ions lithium ions, sodium ions or potassium ions and also to mixtures comprising at least two of lithium ions, sodium ions and potassium ions. Preferred mixtures comprise sodium ions and potassium ions. The alkaline, aqueous alkali metal solution can be obtained here for example by dissolving alkali metal compounds with weak acids or and/or alkali metal hydroxides and also by direct reaction of alkali metal with water. Weak acids are understood here to mean compounds having a pKa for the deprotonation of the final hydrogen atom of at least 8, preferably at least 9 and especially at least 10. One example for a possible alkali metal compound with a weak acid are alkali metal salts of isocyanic acid, alkali metal sulfides, alkali metal phosphates and alkali metal carbonates, preferably alkali metal carbonates. Alkali metal hydroxides and/or alkali metal carbonates are used in particular.

The weight ratio of alkaline, aqueous alkali metal solution and moisture-curing polyurethane adhesive is typically between 2:1 and 1:10, preferably between 1:1 and 1:5. This corresponds to an application of 10 to 150 and preferably 80 to 120 g per m² of reinforcing fiber layer.

The unfinished sandwich component is subsequently placed into a mold and the polyurethane reaction mixture is cured. The mold temperature is preferably 60 to 180° C., particularly preferably 80 to 150° C. and especially preferably 90 to 140° C.

The unfinished sandwich elements are optionally pressed together with an outer layer or a decorative layer. The outer layer or the decorative layer can in this case be applied to one or both sides of the polyurethane sandwich component or placed into the mold. As an alternative, the outer layer or the decorative layer can be applied in a further work step after the polyurethane sandwich component has been demolded.

During the pressing, the core layer is compressed at least in regions. The compression can be varied over a broad range here and can range from a few tens of millimeters to a compression of less than 10% of the starting thickness of the core layer. When pressing the unfinished sandwich component, the core layer is preferably compressed to different degrees in different regions.

The decorative layer used here can be textiles having a barrier against impregnation with polyurethane, compact or foamed plastics films and polyurethane spray skins or polyurethane RIM skins. Outer layers that can be used are preformed materials that are also suitable for outdoor applications, such as metal foils or sheets and also compact thermoplastics composites made from PMMA (polymethyl methacrylate), ASA (acrylic ester-modified styrene-acrylonitrile terpolymer), PC (polycarbonate), PA (polyamide), PBT (polybutylene terephthalate) and/or PPO (polyphenylene oxide) in coated, coatable or colored form. Outer layers used may likewise be continuously or discontinuously produced outer layers based on polyurethane resins, melaminephenol resins, phenol-formaldehyde resins, epoxy resins or unsaturated polyester resins.

The polyurethane sandwich components produced by a process according to the invention may for example be used as structural components or trim parts, especially in the automobile industry, the furniture industry or the construction industry.

The unfinished sandwich components are optionally trimmed during the pressing via what are called flash faces or pinch edges, and no further subsequent operations such as punching or milling are then necessary here.

One advantage of the process according to the invention is that the polyurethane can be used more efficiently and a consistent stiffening of the sandwich elements compared to spray processes of the prior art can be achieved with a smaller amount of polyurethane. In addition, in a process according to the invention, no substances which result in the emission of volatile components and hence in odor formation are used. The polyurethane sandwich moldings according to the invention can thus be used in closed spaces, for example in the interior of vehicles such as automobiles, without this resulting in odor nuisance. Furthermore, in contrast to the spray process, no aerosol formation occurs during production, meaning that no extraction apparatus is required. Moreover, more targeted application results in less non-homogeneous waste. Surprisingly, there are no defects in the surface of the molding even at transition points between regions which have been compressed to different degrees. Even at the edges, the polyurethane adhesive is still sufficiently free-flowing in the molding process that no open edges or corners are formed.

The invention is illustrated hereinafter with reference to examples.

Ex. 1

Production of a Polyurethane Adhesive 378 g of a mixture of 2,4-MDI, 4,4'-MDI and higher polycyclic homologs of MDI having an average isocyanate functionality of 2.7 are initially charged at room temperature and gradually mixed with 420 g of a polyol based on propylene glycol as starter and polyethylene oxide-polypropylene oxide having an ethylene oxide content of approx. 20%, based on the content of ethylene oxide and propylene oxide, and a hydroxyl number of 29.5 mg KOH/g, and 200 g of a polyol based on glycerol as starter and polypropylene oxide-polyethylene oxide having an ethylene oxide content of approx. 70%, based on the content of ethylene oxide and propylene oxide, and a hydroxyl number of 42 mg KOH/g. The mixture is subsequently heated to 60° C. and stirred for 2 hours at 60° C., then cooled down to below 40° C. After cooling down, 0.5 g of diglycol bis(chloroformate) and 0.5 g of 85% orthophosphoric acid were also added to the isocyanate prepolymer.

The polyurethane prepolymer obtained has a viscosity at 25° C. of 19 150 mPas and an NCO content of 9.9% by weight.

Production of a Sandwich Component

A preform was produced from a honeycomb paperboard having a thickness of approx. 18 mm, which had been covered on both sides with Unifilo® 450 woven fiber fabric from Owens Corning. The polyurethane adhesive obtained was applied to both the upper and lower side of the preform sandwich in an amount of in each case 330 g/m² in a roll application process at a roller temperature of 75° C. The surface of the unfinished sandwich component was then sprayed with approx. 100 g/m² of a 10% by weight sodium carbonate solution. The unfinished sandwich element was subsequently pressed to a thickness 1 of 11 mm and a thickness 2 of 2 mm in a mold having a mold temperature of 120° C. and demolded after 90 seconds.

Ex. 2

519 g of a mixture of 2,4-MDI, 4,4'-MDI and higher polycyclic homologs of MDI having an average isocyanate functionality of 2.7 are initially charged at room temperature and gradually mixed with 325 g of a propylene glycol-started polyethylene oxide-polypropylene oxide having an ethylene oxide content of approx. 20%, based on the content of ethylene oxide and propylene oxide, and a hydroxyl number of 29.5 mg KOH/g, and 155 g of a glycerol-started polypropylene oxide-polyethylene oxide having an ethylene oxide content of approx. 70%, based on the content of ethylene oxide and propylene oxide, and a hydroxyl number of 42 mg KOH/g. The mixture is subsequently heated to 60° C. and stirred for 2 hours at 60° C., then cooled down to below 40° C. After cooling down, 0.5 g of diglycol bis(chloroformate) and 0.5 g of 85% orthophosphoric acid were also added to the isocyanate prepolymer.

The polyurethane prepolymer obtained has a viscosity at 25° C. of 8250 mPas and an NCO content of 14.4% by weight.

A preform was produced from a honeycomb paperboard having a thickness of approx. 18 mm, which had been covered on both sides with Unifilo® 450 woven fiber fabric from Owens Corning. The polyurethane adhesive obtained was applied to both the upper and lower side of the preform sandwich in an amount of in each case 330 g/m² in a roll application process at a roller temperature of 75° C. The surface of the unfinished sandwich element was then sprayed with approx. 100 g/m² of a 10% by weight sodium carbonate solution. The unfinished sandwich element was subsequently pressed to a thickness 1 of 11 mm and a thickness 2 of 2 mm in a mold having a mold temperature of 120° C. and demolded after 60 seconds. A perfect component was obtained. The polyurethane sandwich molding obtained displayed a very good bonding between the reinforcing fiber layer and the honeycomb paperboard, with only a low proportion of the polyurethane adhesive penetrating into the interior of the honeycomb paperboard, signifying a low loss of polyurethane adhesive. The edge formation in the 11 mm/2 mm border area was outstanding, as were the mechanical properties of the polyurethane sandwich molding obtained.

Ex. 3

The experiment was repeated using a woven carbon fiber fabric and a woven natural fiber jute fabric instead of the Unifilo® 450 woven glass fiber fabric, under otherwise identical conditions. In this case too, a polyurethane sandwich molding having a very good bonding between the reinforcing fiber layer and the honeycomb paperboard was obtained, with only a low proportion of the polyurethane adhesive penetrating into the interior of the honeycomb paperboard. The edge formation in the 11 mm/2 mm border area and the mechanical properties of the polyurethane sandwich moldings obtained were also outstanding.

The invention claimed is:

1. A process for producing polyurethane sandwich moldings comprising at least one core layer and at least one reinforcing fiber layer, wherein
   i. at least one reinforcing fiber layer is applied onto a core layer and a moisture-curing polyurethane adhesive is applied to the at least one reinforcing fiber layer,
   ii. the part from i. is placed into a mold and pressed in the mold and the moisture-curing polyurethane adhesive is cured, wherein the mold defines edges of the cured polyurethane adhesive, wherein the polyurethane adhesive is sufficiently free-flowing in the mold such that no open edges or corners are formed, and
   iii. the molding from ii. is removed from the mold and optionally subjected to further operations,
   wherein the moisture-curing polyurethane adhesive has a viscosity of 6000 mPas to 50000 mPas, measured at 25° C. according to DIN 53018,
   wherein the moisture-curing polyurethane adhesive comprises at least 80% by weight, based on a total weight of the moisture-curing polyurethane adhesive, of isocyanate-terminated prepolymer which is obtainable by mixing a stoichiometric excess of aromatic isocyanate with polymeric compounds having at least two isocyanate-reactive groups and optionally compounds having only one isocyanate-reactive group and optionally chain extenders and/or crosslinking agents and the moisture-curing polyurethane adhesive is applied before or after application of the at least one reinforcing fiber layer onto the core layer and for the curing the moisture-curing polyurethane adhesive is brought into contact with water or with a solution comprising water.

2. The process according to claim 1, wherein the isocyanate-terminated prepolymer has an NCO content of 5% to 20% by weight.

3. The process according to claim 1, wherein the aromatic isocyanate comprises isocyanates selected from the group consisting of 2,4'-MDI, 4,4'-MDI, higher polycyclic homologs of MDI or mixtures of two or more of these components.

4. The process according to claim 1, wherein the polymeric compounds having at least two isocyanate-reactive groups comprise at least one polyetherol obtainable by alkoxylation of a starter molecule having a functionality of 2 to 4 and an average content of ethylene oxide, based on a total weight of alkylene oxide, of 20% to 70% by weight.

5. The process according to claim 1, wherein the polyurethane adhesive is used in an amount of 200 to 2000 g/m² on the at least one reinforcing fiber layer.

6. The process according to claim 1, wherein the moisture-curing polyurethane adhesive is applied to the at least one reinforcing fiber layer on one side or on both sides before application of the at least one reinforcing fiber layer onto the core layer.

7. The process according to claim 6, wherein the moisture-curing polyurethane adhesive is applied to the at least one reinforcing fiber layer by roll application.

8. The process according to claim 6, wherein the at least one reinforcing fiber layer comprising polyurethane adhesive is applied onto the core layer one hour to 3 months after application of the polyurethane adhesive.

9. The process according to claim 1, wherein the moisture-curing polyurethane adhesive is brought into contact with an alkaline, aqueous alkali metal solution for the curing.

10. The process according to claim 9, wherein a concentration of the alkaline, aqueous alkali metal solution is 0.1 to 10 M, based on alkali metal.

11. The process according to claim 9, wherein a pH of the aqueous, alkaline alkali metal solution is at least 10.

12. The process according to claim 9, wherein the alkaline, aqueous alkali metal solution is applied to the polyurethane adhesive in an amount of 10 to 150 g/m².

13. The process according to claim 1, wherein the mold in step (ii.) comprises a decorative element.

14. The process according to claim 1, wherein the at least one reinforcing fiber layer is a glass fiber layer or a carbon fiber layer.

15. The process according to claim 1, wherein a material used for the core layer is paper honeycombs, metal honeycombs or plastic honeycombs.

16. The process according to claim 1, wherein the moisture-curing polyurethane adhesive has a viscosity of 7000 mPas to 50000 mPas, measured at 25° C. according to DIN 53018.

17. The process according to claim 1, wherein the optional further operations do not comprise punching or milling.

\* \* \* \* \*